United States Patent [19] [15] 3,685,665
Atwater [45] Aug. 22, 1972

[54] KNOCKDOWN STORAGE FRAME AND COMPONENTS

[72] Inventor: Wayne G. Atwater, Willoughby, Ohio

[73] Assignee: The Triax Company, Cleveland, Ohio

[22] Filed: Oct. 23, 1970

[21] Appl. No.: 83,412

[52] U.S. Cl. ......................211/177, 52/720, 108/56
[51] Int. Cl. ...............................................A47f 5/10
[58] Field of Search............211/177, 176, 175, 148; 108/53, 54, 56, 106, 107; 214/16.4; 248/125, 122, 165, 221, 243, 241, 245

[56] References Cited

UNITED STATES PATENTS

| 3,323,655 | 6/1967 | Foran | 211/134 |
| 2,508,032 | 5/1950 | Kennedy | 52/731 |
| 2,577,671 | 12/1951 | Barrett | 52/731 |
| 2,728,545 | 12/1955 | Hermitage | 108/56 |
| 3,132,609 | 5/1964 | Chesley | 108/106 |
| 3,337,061 | 8/1967 | Caudell | 211/177 X |
| 3,388,809 | 6/1968 | Irish | 211/177 X |
| 3,545,626 | 12/1970 | Seiz | 211/176 |
| 3,550,785 | 12/1970 | Seiz | 211/176 |

FOREIGN PATENTS OR APPLICATIONS

| 292,109 | 1/1929 | Great Britain | 52/720 |
| 812,600 | 9/1951 | Germany | 52/720 |

Primary Examiner—Nile C. Byers, Jr.
Attorney—Baldwin, Egan, Walling & Fetzer

[57] ABSTRACT

A storage framework composed of a plurality of storage frame elements or components assembled into a storage rack for use in an automatic warehousing system. The framework comprises generally parallel rows of vertical columns with each of the columns being of generally double wall, hollow channel-shape in horizontal section, with the hollow arm portions of the channel configuration forming tubular-like sections, and with the cross web of the channel configuration connecting the aforementioned tubular sections, comprising plural abutting walls. Load carrying means are spaced vertically along the columns and define the storage volumes in the storage rack. The load carrying means comprise assemblies including spaced end portions which have recess means formed therein for receiving the confronting one of the columns in nested relationship therein for securing the load carrying assembly to the associated columns. In one embodiment, the assembly includes load support rails extending generally the full depth of the respective storage volume, and with such rails being oriented laterally outwardly from the end portions for supporting loads thereon in bridging relationship across opposing pairs of the rails. In another embodiment, spaced stub supports are utilized for supporting loads in bridging relationship. The arrangement is such so as to provide high strength to the columns which are torsionally strong and rigid due to their novel structural arrangement, resulting in a high strength, rigid due to their novel structural arrangement, resulting in a high strength, rigid rack assembly, and a rack assembly wherein the component parts thereof can be readily fastened into position for field assembly. This facilitates the fabrication, preparation, and handing of the storage rack components and facilitates assembly thereof at the location of use.

13 Claims, 16 Drawing Figures

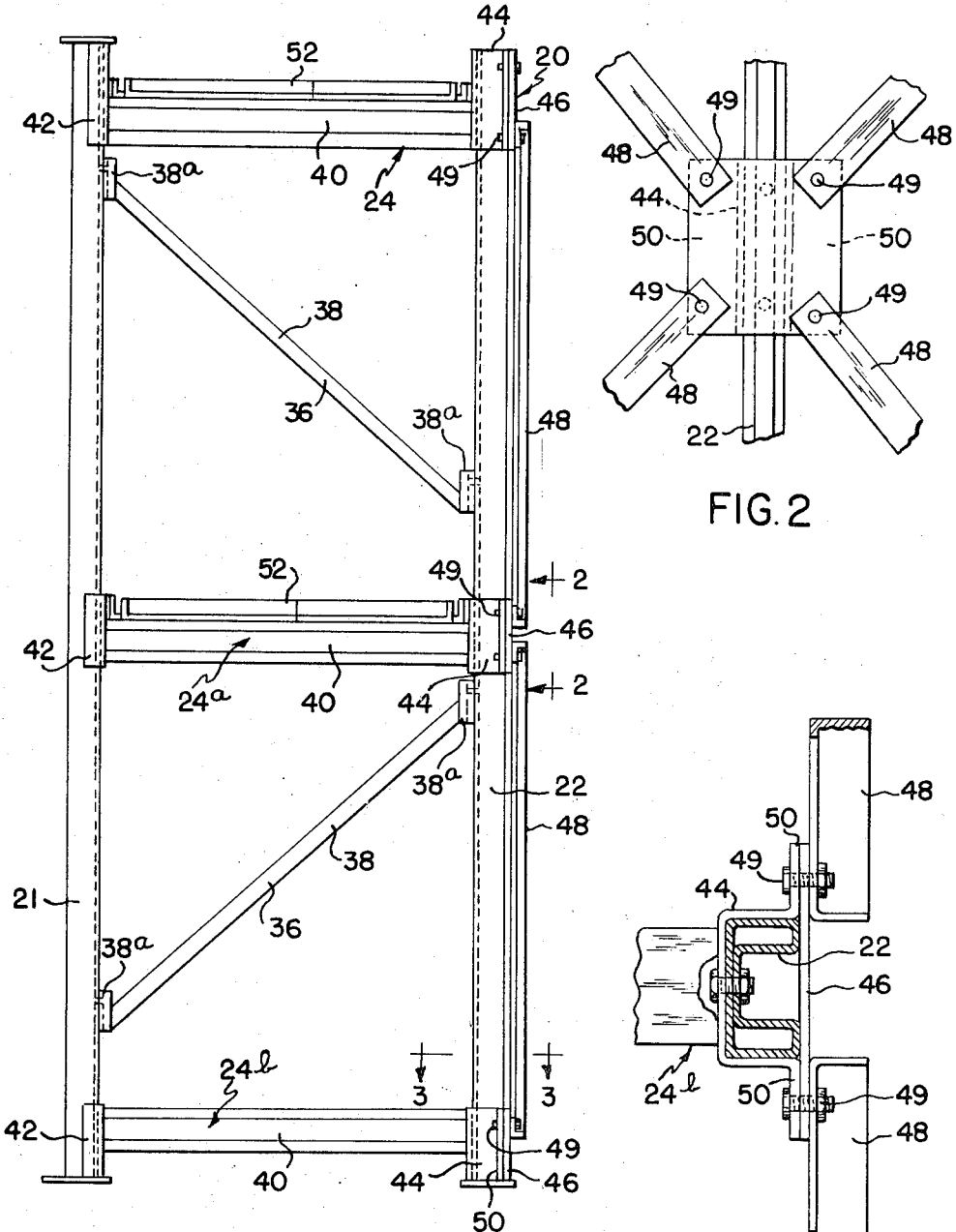

INVENTOR.
WAYNE G. ATWATER
BY
Baldwin, Egan, Walling & Fetzer
ATTORNEYS

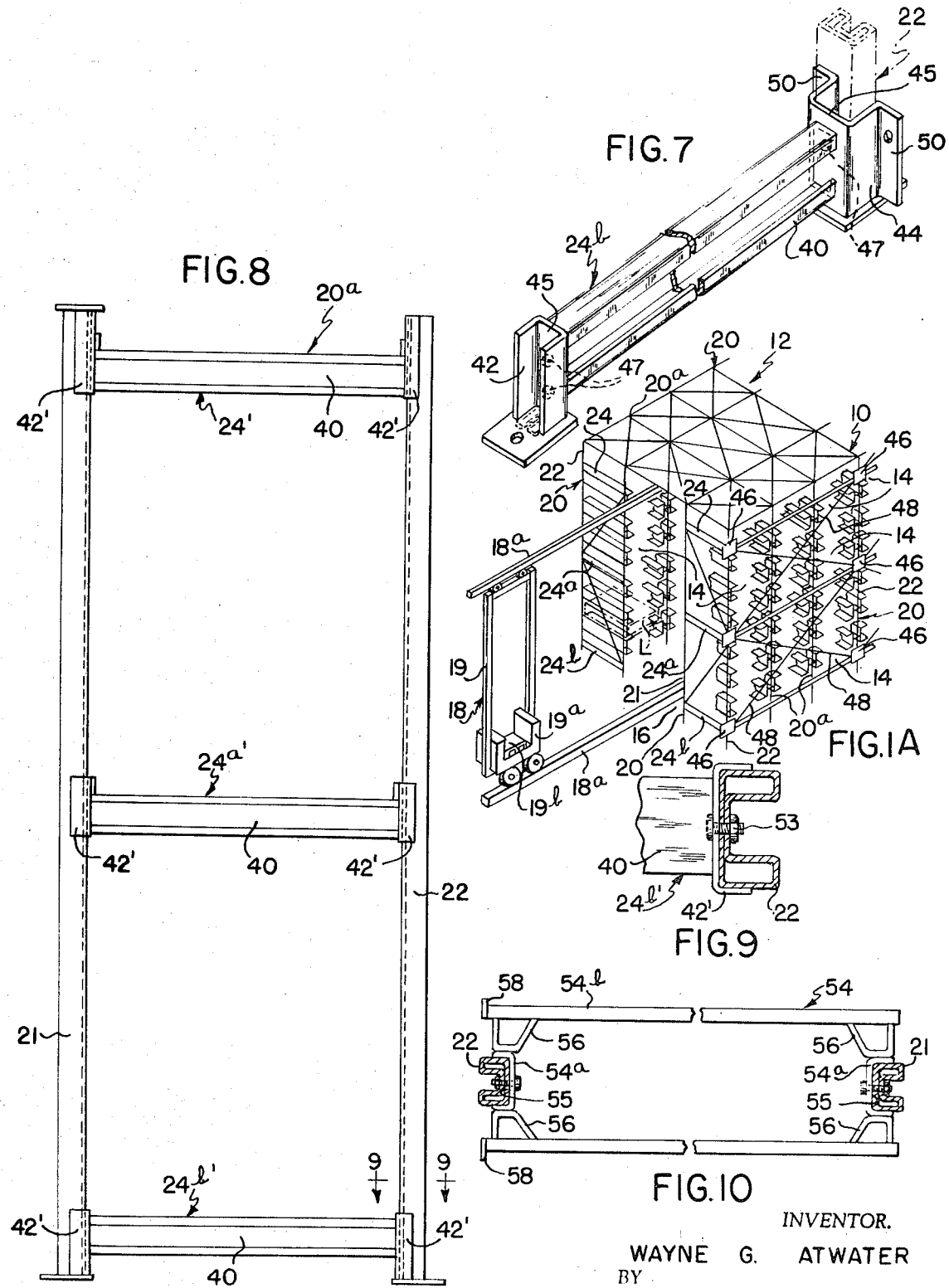

KNOCKDOWN STORAGE FRAME AND COMPONENTS

This invention relates to structural components for use in a storage rack for automatic warehousing systems, and wherein the storage rack comprises a plurality of load bearing columns of novel structural arrangement which increases the strength, the rigidity and resistance to torsional stress of the storage rack structure, and wherein the various components forming the storage rack are so constructed and arranged that they can be readily handled and bundled at the point of manufacture and may then be conveniently shipped to the location of use and assembled at the site utilizing suitable fasteners. This arrangement results in a material reduction in the costs of fabrication and shipping to the point of use thereof, of storage rack structure for warehousing.

BACKGROUND OF THE INVENTION

Heretofore it has been conventional to fabricate storage rack sections for automatic warehousing systems at a manufacturing facility and ship these fabricated sections, portions of which are called "ladders," to the site of use where they are assembled with other components to form the completed storage rack. Factory fabrication and handling of the "ladders" and other assembled components of a storage rack becomes increasingly difficult as the sizes of the "ladders" and other assemblies increase, due to larger warehousing systems. Moreover, as the warehousing systems increase in size, a greater strength and especially torsional strength is required for the storage rack components including load bearing columns of the rack. Variations in sizes of ladders from one job to the next make efficient tooling for mass production of the "ladders" prohibitive, and the costs involved in the handling and manufacturing of the "ladders" and other structural components for the storage rack run high. Moreover, shipping of the fabricated "ladders" and other parts and assemblies for the rack construction to the site of use is costly, generally necessitating individual handling and much wasted space in the conveying vehicles.

SUMMARY OF THE INVENTION

The present invention provides various structural components and assemblies for forming storage racks for automatic warehousing systems, and wherein such components are substantially rectilinear in configuration making them adapted to line fabrication and cleaning and painting, and making possible handling of the storage rack components in relatively compact bundles for shipment. The components are such that they can be readily assembled at the location of use and the construction of the columns and load supporting members of the storage structure are such that they materially increase the rigidity and overall strength, including the torsional strength, of the storage rack. The arrangement is such that the rack components cost less to fabricate at the factory and to handle and ship to the site of use, and make it possible to utilize a considerable portion of standardized components in the making up of different sizes of warehousing storage structures.

Accordingly, an object of the invention is to provide a novel storage framework or rack for warehousing systems.

Another object of the invention is to provide a framework of the latter described type which can be readily assembled on site, and wherein the components for constructing the warehousing racking are of a generally rectilinear type, greatly facilitating the handling during manufacturing and bundling and shipping thereof to the site of use.

A further object of the invention is to provide a storage framework of the above described type wherein the components utilized in the construction of the racking can be standardized in certain instances, for use in different sizes of warehousing systems thereby making it possible to economically produce, store and construct storage racking for warehousing systems.

Another object of the invention is to provide a storage framework of the aforementioned type wherein the load bearing column components thereof are of a novel structural arrangement of double wall, generally C or channel shaped configuration in transverse section, with the arm portions of the channel configuration being hollow to provide box or tubular-like sections and with the cross web connecting the spaced arm box sections being of a double wall thickness, resulting in a high strength column having good resistance to torsional stress.

Another object of the invention is to provide a storage framework of the aforementioned type utilizing load supporting assemblies for supporting loads in bridging relationship across the storage volumes of the framework, and wherein such assemblies include end portions having recesses adapted to receive a respective of the columns therein in snug nesting relation, for increasing the strength and rigidity of the framework structure.

Other objects and advantages of the invention will be apparent from the following description taken in conjunction with the accompanying drawings wherein:

FIG. 1 is an elevational view of one of the ladder assemblies adapted to be assembled in the form illustrated at the site of use, and which forms one of the main components of the storage rack; the ladder assembly is comprised of the novel load bearing column construction, for increasing the strength, rigidity and resistance to torsional stress of the storage rack; the load carrying assemblies, which are also adapted for assembly with the ladders at the site of use, are not shown assembled with the ladder in this view;

FIG. 1A is a fragmentary, generally diagrammatic, perspective illustration of a storage rack and associated automatic load carrier in a warehousing system which includes the storage frame racking of the invention;

FIG. 2 is a fragmentary, enlarged view taken generally along the plane of line 2—2 of FIG. 1 looking in the direction of the arrows and illustrating the connections for diagonal stringers on the outer or rear surface of the rack which tie the ladder assemblies together in the longitudinal direction of the storage rack;

FIG. 3 is a sectional view taken generally along the plane of line 3—3 of FIG. 1 looking in the direction of the arrows, and illustrating the connection of the bottom spreader member of the ladder assembly to the outer column of the ladder and also to the aforementioned diagonal stringers of FIG. 2;

FIG. 7 is an enlarged, broken, perspective view of the base spreader member utilized in the ladder assembly of FIG. 1;

FIG. 8 is an enlarged elevational view of another ladder assembly utilized in the storage rack and which is generally similar to the assembly of FIG. 1 except that it does not include the diagonally arranged truss members utilized in the FIG. 1 assembly; the FIG. 8 type of ladder is adapted to be assembled intermediate the FIG. 1 type ladders;

FIG. 9 is an enlarged sectional view taken generally along the plane 9—9 of FIG. 8 looking in the direction of the arrows and illustrating the partial encompassing of the outer column by the end section of the base spreader member and its attachment to the column;

FIG. 10 is a broken top plan illustration of one of the load support member assemblies showing the K-like end portions supporting elongated load supporting rail members thereon and illustrating the recess in each end portion adapted for receiving in snug relation the confronting column;

DESCRIPTION OF THE PREFERRED EMBODIMENTS

Figure 3A:
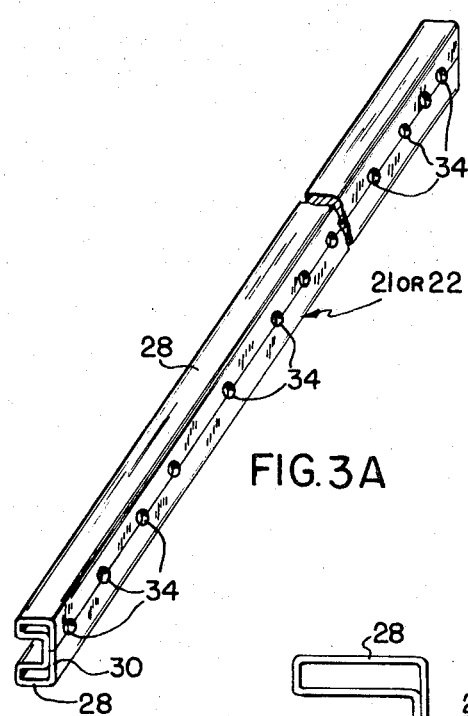
FIG. 3A is a broken prospective view of one of the novel columns utilized in the storage rack.

Referring now again to the drawings, and particularly to FIGS. 1, 1A and 8 thereof, there is illustrated in FIG. 1A a portion of a storage rack in an automatic warehousing system comprising opposed storage rack sections 10 and 12 defining a plurality of horizontally and vertically arranged storage volumes or bins 14 which are adapted to store loads L therein, with the loads disposed in bridging relation across the associated load carrying members of the respective storage volume. As illustrated in FIG. 1A, there is a storage rack section disposed on each side of a centrally located aisle or travel zone 16 in which an automatic load carrier 18 is adapted to move on tracks or guides 18a, for handling loads at selected storage bin locations in the storage frame sections.

The load carrier mechanism 18 may comprise a horizontally movable carriage 19 on which is mounted a vertically movable elevator 19a which carries a transversely or laterally movable extractor mechanism 19b for placing loads into or removing loads from selected storage volumes. Reference may be had to U.S. Pat. No. 3,139,994 issued July 7, 1964 in the name of A. R. Chasar, and U.S. Pat. No. 3,402,835 issued Sept. 24, 1968 in the name of Sanford Saul, for a more detailed disclosure of an automatic warehousing arrangement of the general type with which the present invention may be utilized.

Each storage frame section is formed of a plurality of the ladder assemblies 20 and 20a (FIGS. 1 and 8) which in turn are each comprised of an aisle post or column 21 adapted for disposal along the travel zone 16 and in longitudinal alignment with the aisle posts in the adjacent ladder assemblies, and a laterally spaced outer column or post 22, which is adapted for alignment with the corresponding outer columns in the adjacent ladder assemblies. Spreader members 24, 24a and 24b extend between and are adapted for connection to a respective zone and outer column, to form a ladder assembly. Spreaders 24, 24a and 24b may be of the fabricated construction illustrated. The ladder components are so constructed and arranged that they can be produced at the place of manufacture utilizing inline processes and procedures, and can be readily painted and handled during the manufacturing thereof and then can be bundled into compact bundles and shipped to the site of use, where the components can be readily assembled together, thereby obviating many of the problems hereto associated with manufacturing and shipping warehousing storage racks.

Figure 3B:
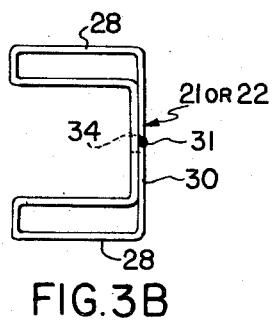
FIG. 3B is an enlarged end elevational view of the column member of FIG. 3A illustrating the box section configuration of the arm portions of the columns connected by the double wall cross web of the column.

In this connection, the columns 21, 22 of the ladder assemblies 20, 20a are formed to present a novel high strength arrangement to enhance the rigidity and resistance to torsional stress thereof. Such columns 21, 22 possess a hollow, double wall C-like or channel-like configuration in transverse cross section, and wherein the arm portions 28 (FIGS. 3A and 3B) of each of the columns are hollow box-like sections connected by double wall cross web portion 30. The columns may be formed of a single sheet or plate of metal connected or welded as at 31 (FIG. 3B). Such column construction provides a column which has the strength advantages of the box or cylindrical column, and also the advantage of being able to be readily connected to the other structural components making up the storage rack, and also a structural column component which can be readily formed. As can be best seen in FIG. 3B, the arm portions 28 are preferably each of a greater length than width and the web portion 30 is of a greater thickness than the thickness of the walls defining each of the arm portions. The columns are preferably provided with openings 34 spaced along the lengthwise extent thereof which are adapted to receive fastening means for connecting various components including the aforementioned spreaders 24, 24a and 24 b, to the columns for formation of the ladders 20, 20a and connecting the ladders into a finished storage rack. Such arrangement facilitates the assembly of the components at the site of use, and eliminates the need for welding the components together into a finalized structural arrangement.

Figure 4:
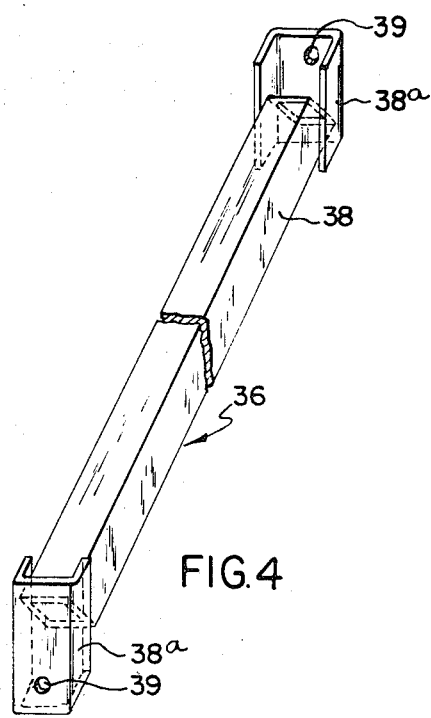
FIG. 4 is an enlarged, broken perspective view of one of the diagonal truss members utilized in the ladder assembly of FIG. 1.

As can be best seen in FIG. 4, the diagonal truss members 36 of ladder assembly 20 can be formed of a box section stringer 38 suitably attached as by means of welds to the end sections 38a which have openings 39 therein adapted for alignment with a corresponding openings in the confronting column members 21, 22 (FIG. 1) for receiving fastening means such as nut and bolt assemblies, or rivets, therethrough, for coupling a pair of the columns 21, 22 together into a rigid ladder assembly.

The aforementioned spreader members 24, 24a, 24b are preferably of fabricated construction, readily manufactured in inline production and readily bundled for compact shipment to the site of use. Each of said spreader members comprises a horizontally extending connecting element 40, with end elements 42, 44 secured thereto as by means of welds, with each of the end elements defining a recess 45 for receiving the respective confronting column therein in snug, nested relation. End element 42 of each spreader member may only partially encompass the sides of the respective column of ladder assembly 20, and as shown in FIG. 1, while the end element 44 of the respective spreader member may encompass the full extent of the sides of the column 22. Openings through the end elements provide for attachment of the latter to the confronting column members by means of conventional fasteners extending through openings in the columns. Accessibility to such openings e.g. 47) are provided for by the open side of the connecting element 40 of the respective spreader member.

Figure 5:
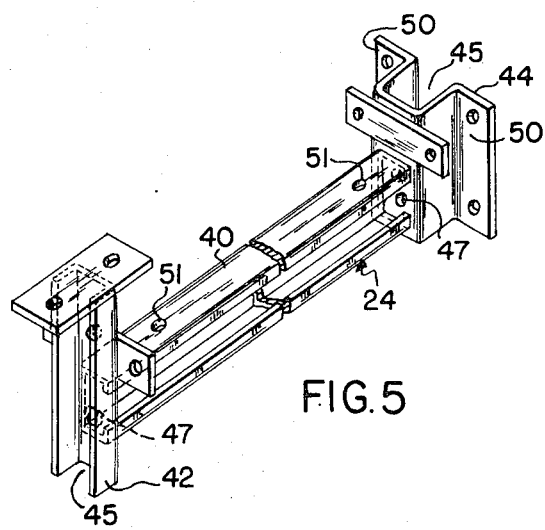
FIG. 5 is an enlarged, broken, perspective, illustration of the top spreader member of the ladder assembly of FIG. 1.
Figure 6:
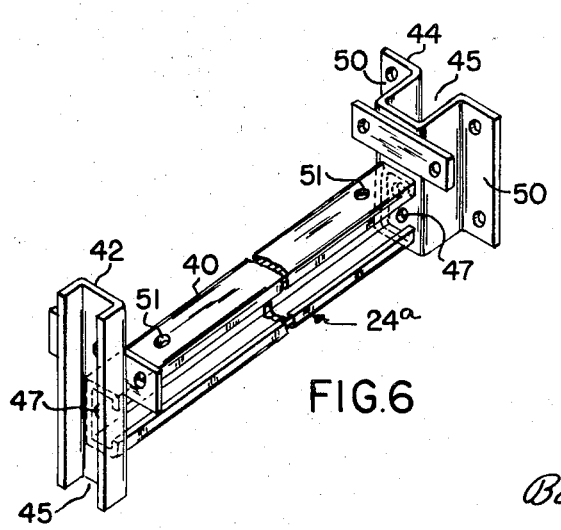
FIG. 6 is an enlarged, broken, perspective illustration of the middle spreader member utilized in the ladder assembly of FIG. 1.

A covering plate member 46 (FIGS. 1, 1A, 2 and 3) is provided for locking the end of the respective spreader element to the column 22 in encompassing relation. Plates 46 are adapted to be coupled to the diagonal bracing members 48 (FIGS. 1 and 1A) extending diagonally between ladder assemblies 20 in the storage rack, for rigidifying the latter and aiding in maintaining the columns of the storage rack in vertically upright, aligned condition. As can be seen from FIG. 2, the same fasteners 49 that couple the diagonal bracing members 48 to the cross plate 46 can be utilized for securing the cross plate 46 to the lateral flanges or wings 50 of the end portions 44 of the spreader members. As can be seen in FIGS. 5, 6 and 7, the various spreaders are provided with openings 51 therein for ready attachment thereto of other structural components such as for instance the longitudinally extending bracing stringers 52 (FIG. 1).

The ladder assembly 20 of FIG. 8 utilizes the same column construction utilized in the ladder assembly 20 of FIG. 1 but wherein the spreader members 24', 24a', 24b' have end portions 42' which are formed generally similar to the end portions 42 of the corresponding spreader members of the FIG. 1 ladder assembly, so that only a portion of the sides of the respective column is encompassed by the associated end portion rather than having the full sides of the column encompassed. It will be seen that in this arrangement of ladder assembly, the columns are still received in snug nested relation in the end portions of the spreader members, and are attached to the columns via fastener means, such as nut and bolt assemblies 53 (FIG. 9) extending through the end portion of the respective spreader member and through the cross web of the associated column, so that the spreader members are rigidly secured to the respective column.

Figure 11:
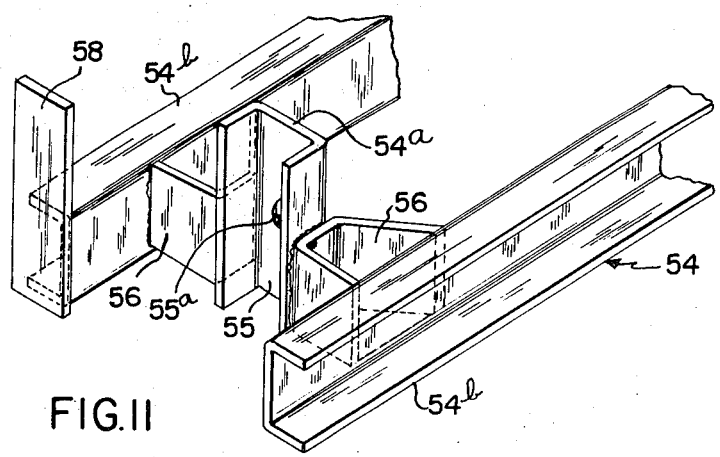
FIG. 11 is an enlarged, fragmentary, perspective view of the rearward end of the load support assembly of FIG. 10.

Referring now to FIGS. 10 and 11, there is illustrated a fabricated load support assembly 54 which is adapted for attachment to respective confronting zone and outer columns, for supporting loads L in bridging relation across opposing portions of adjacent of the assemblies, and as shown for instance in FIG. 1A. Such load support assemblies 54 comprise spaced end portions 54a, which support thereon elongated load supporting rail members 54b which may be conventional channel components, for supporting one side of a load thereon. End portions 54a each comprise a recess 55 which may be formed of a conventional channel section and which is adapted to receive a respective zone or an outer column therein in relatively snug relation. Recess section 55 may have an opening 55a therethrough which is adapted for alignment with a corresponding opening in the confronting column, for receiving fastener means therethrough (FIG. 10) for securing the load support assembly to the respective column.

Secured as by means of welds to the opposite sides of section 55 are generally U-shaped (in plan) strap portions 56 which in turn are secured at their distal ends and as by means of welds to a respective one of the aforementioned elongated rail members 54b. It will be seen that the end portion 54a presents a generally K-shaped configuration in plan. A stop plate 58 may be attached as by means of welds to the inner end of at least one of the elongated rail members 54b, to limit the movement of a load therealong and thus limit the extent of movement of a load into a respective storage volume.

Figure 12:
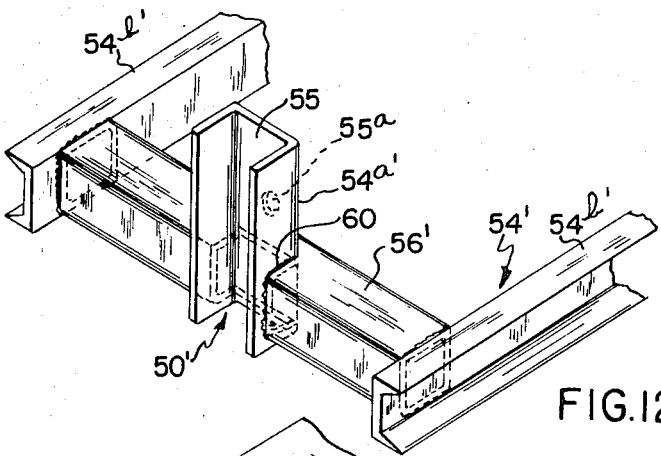
FIG. 12 is a fragmentary, perspective, illustration of a modified form of load support assembly adapted for attachment to confronting load bearing columns, and which is identified as a heavy duty load support assembly for use with heavier types of loads.

FIG. 12 illustrates a modified form of load support assembly 54' again utilizing an end portion 54a' having a recess 55 therein for receiving the respective confronting column in relatively snug relation, and having an opening 55a therethrough for alignment with an opening in the respective column, for securing the load support assembly to the column. However, in this embodiment, which is identified as a heavy duty load support assembly, the members 54b' are of a generally heavier channel-shaped construction and are attached to the central channel section 55 by transverse tube or box section 56', which has been recessed as at 60 to receive therein the central channel section 55. Welds may secure the central section 55 to box section 56'. Such an arrangement provides a higher strength load support assembly for supporting heavier loads thereon in the storage rack.

Figure 13:
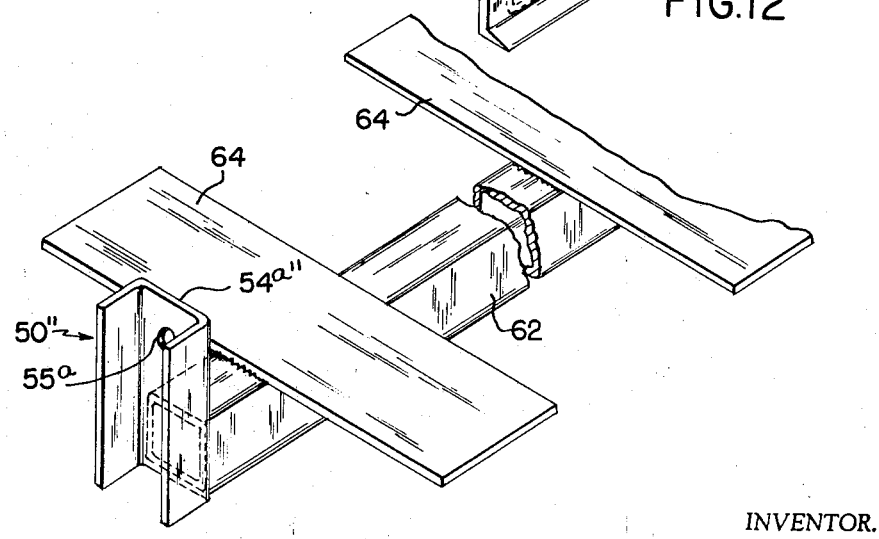
FIG. 13 is a fragmentary, broken, perspective illustration of a further modified form of load support assembly wherein the load support members comprise lengthwise spaced cross stub members instead of the elongated rail members utilized in the assemblies of FIGS. 10 and 11.

FIG. 13 is a further modified load support assembly wherein the end portions 54a'' are channel shaped sections each having openings 55a therein adapted for alignment with a corresponding opening e.g. 34) in the respective column, for receiving a fastener therethrough for securing the load support assembly to the confronting column, and wherein the opposing end portions 54a'' are connected to one another by preferably a single horizontally extending support member 62 in the embodiment illustrated, of box cross section, and which is secured as by means of welds to the end portions 54a''. Stub load support plates 64 are secured as by means of welds to the support member 62, and extend laterally therefrom a predetermined distance for supporting loads on laterally spaced stub plates. It will be understood that the distance between the laterally spaced load support members of one storage volume, such as for instance, rail members 54b, 54b' or stub plates 64 are such so that the extractor 19b of the load carrier mechanism can move vertically therebetween to deposit a load thereon or to raise a load therefrom, without interference of the extractor with the load support members of the load support assemblies.

While various specific arrangements of load support assemblies have been shown for use with the hollow channel-shaped columns of the storage structure for supporting loads in bridging relationship thereon, it will be understood that other load support structure might be utilized with such double wall channel-shaped columns instead of the load support assemblies illustrated, and as for instance longitudinally extending load support stringers extending along the respective row of travel zone and outer columns, or load support members of the general type shown in, for instance, applicant's U.S. Pat. No. 3,372,816 issued Mar. 12, 1968.

From the foregoing description and accompanying drawings it will be seen that the invention provides a novel storage framework or rack for use in automatic warehousing systems, formed of components which are primarily rectiliner-like components or fabrications, and which expedite the manufacture, processing and handling of the components, and the shipping thereof to the location of use, where they are adapted for assembly by fasteners into finished storage racks. The columns of the storage rack are of a novel configuration providing hollow box sections connected by a transverse web section which provides rigidity and high strength characteristics to the rack assembly, and provides the columns with good resistance to torsional stress.

The invention also provides various load support assemblies for ready attachment to the columns of the storage structure for supporting loads in bridging relationship between laterally disposed and aligned load support members of the assemblies, and wherein such load support assemblies can be readily fabricated and shipped to the site of use, for facilitating the erection of the storage rack at the desired site, and which provide strength and rigidity to the storage rack structure.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

What is claimed is:

1. In a storage framework for a warehousing system adapted for assembly so as to have a travel zone running along side said framework for movement of a mechanical load carrier therein operable for depositing loads into and withdrawing loads from the storage framework, said framework defining a plurality of vertically and horizontally arranged storage volumes having open-load receiving ends adapted to face the travel zone, said framework comprising generally parallel longitudinal rows of spaced substantially vertical columns including a row of longitudinally spaced travel zone columns adapted for disposal along the travel zone and a row of longitudinally spaced outer columns spaced laterally outwardly respectively from said travel zone columns, at least certain of said columns each being of double-wall, hollow channel-like configuration in transverse cross-section, and a plurality of vertically spaced laterally disposed load carrying means supported by said columns and defining said storage volumes, and wherein said load carrying means each comprises an assembly extending between and being connected to a respective pair of zone and outer columns, each said assembly comprising load rails extending from one end of said assembly generally adjacent the respective zone column to the other end of said assembly generally adjacent the respective outer column, to thereby extend for substantially the full depth of the respective storage volume, laterally opposed of said load carrying rails in the same storage volume being adapted for supporting a load in bridging relation thereacross, each load carrying assembly including K-like in plan end portions, said load supporting rails of each assembly extending between and being connected to the K-like end portions of the respective assembly, each K-like end portion including an outwardly facing recess therein in which the respective column is received in relatively snug relation, and fastener means extending between each K-like end portion and the respective column for securing the load carrying assembly to respective zone and outer columns.

2. A storage framework in accordance with claim 1 wherein each of said hollow channel-like columns include tubular like arm portions and a cross web portion of double wall thickness connecting said arm portions, the walls of said cross web portion being disposed in generally abutting relation.

3. A storage framework in accordance with claim 2 wherein said columns include a plurality of openings spaced vertically with respect to one another along said cross web portion thereof for attachment of other components of said framework including said load carrying means to the columns.

4. A storage framework in accordance with claim 1 including other means extending between and connecting respective of said travel zone and outer columns together, the last mentioned other means including a spreader member comprising a cross section and attached end sections disposed between confronting of said zone and outer columns, and means securing the spreader member to the respective pair of said columns, at least one of said end sections having open ended means thereon receiving in nested relation the respective confronting column so that said one end section at least partially encompasses said confronting column.

5. A storage framework in accordance with claim 4 wherein said means on said one end section is of sufficient depth to completely encompass the sides of the respective column received therein and with the last mentioned means being of such width that said respective column is received therein in snug relation, and a plate member extending transversely of the open end of said one end section and being attached thereto for completely encompassing therein said respective column.

6. A storage framework in accordance with claim 2 wherein each of said tubular-like arm portions is of a greater length dimension in a direction perpendicular to the plane of said cross web portion than the width dimension of the respective arm portion.

7. A storage framework in accordance with claim 1 wherein each said K-like end portion comprises a channel shaped in plan central section defining said recess and generally U-shaped in plan side sections connected to said central channel section, said channel section opening in the direction toward the respective column and receiving the latter therein in relatively snug relation.

8. A storage framework in accordance with claim 4 wherein said cross section of said spreader member is of channel-like configuration and said end sections of said spreader member each has an opening therethrough opening into said channel-like section, said openings being accessible from exteriorly of said channel-like section through the open side thereof, each of said columns including tubular-like arm portions running the full length of the respective column and a cross-web portion connecting said arm portions, said cross-web portion having an opening therethrough disposed in alignment with the opening in the respective end section, and fastener means extending through said openings and between said cross-web portion and respective of said end sections for tightly attaching said spreader member to the confronting columns. 9. A storage framework in accordance with claim 5 wherein said one end section is of channel-like configuration in plan having laterally extending wings thereon with said plate extending in transverse relation to said respective column and in confronting relation to said wings, and fastener means extending between said wings and said plate member for securing the latter to said one end section.

10. A storage framework in accordance with claim 5 wherein said plate member provides an anchor for tying together tie members extending diagonally from one plate member on one column to another plate member on another column, and wherein said plate members coact only with certain of said outer columns.

11. A storage framework in accordance with claim 1 wherein each respective pair of said zone and outer columns include spreader means extending therebetween, said spreader means being spaced vertically along said pairs of columns, each of said columns including tubular-like arm portions and a cross-web portion connecting said arm portions, said cross-web portion being of double wall thickness with the walls of said cross-web portion being disposed in generally abutting relation, each of said columns being received into respective recess means in said spreader members for rigidifying the associated column, and means connecting the pairs of columns to the respective spreader members.

12. A storage framework in accordance with claim 1 including fastener means removably attaching at least certain of the components of said framework tightly together, said fastening means being disassembleable for disassembly of said storage framework.

13. In a storage framework for a warehousing system adapted for assembly so as to have a travel zone running along side said framework for movement of a mechanical load carrier therein operable for depositing loads into and withdrawing loads from the storage framework, said framework defining a plurality of vertically and horizontally arranged storage volumes having open load receiving ends adapted to face the travel zone, said framework comprising generally parallel longitudinal rows of spaced substantially vertical columns including a row of longitudinally spaced travel zone columns adapted for disposal along the travel zone and a row of longitudinally spaced outer columns spaced laterally outwardly respectively from said travel zone columns, at least certain of said columns each being of double wall, hollow channel!-like configuration in transverse cross-section, and a plurality of vertically spaced laterally disposed load carrying means supported by said columns and defining said storage volumes, said load carrying means each comprising an assembly extending between and being connected to a respective pair of zone and outer columns, each said assembly including end portions and elongated load supporting rail members extending between and being connected to said end portions, each end portion including an outwardly facing recess therein receiving therein the respective column in relatively snug at least partially enclosing relation, each said end portion including a portion extending laterally from opposite sides of said recess and attached at its distal ends to respective of said load supporting rail members, each said end portion being of generally K-like configuration in plan.

* * * * *